(No Model.)

O. A. ENHOLM.
GALVANIC BATTERY.

No. 441,403. Patented Nov. 25, 1890.

WITNESSES:

INVENTOR
Oscar A. Enholm
BY
T. F. Bourne
his ATTORNEY.

UNITED STATES PATENT OFFICE.

OSCAR A. ENHOLM, OF NEW YORK, N. Y., ASSIGNOR, BY DIRECT AND MESNE ASSIGNMENTS, TO THE ENHOLM ELECTRICAL CONSTRUCTION COMPANY, OF SAME PLACE.

GALVANIC BATTERY.

SPECIFICATION forming part of Letters Patent No. 441,403, dated November 25, 1890.

Application filed April 21, 1890. Serial No. 348,830. (No model.)

*To all whom it may concern:*

Be it known that I, OSCAR A. ENHOLM, a citizen of the United States, and a resident of New York city, county and State of New York, have invented certain new and useful Improvements in Electrical Batteries, of which the following is a specification.

The object of my invention is to so improve the construction of electrical batteries that the elements can be readily removed and changed, at the same time increasing the efficiency of the battery.

The invention consists in the novel details of improvement and the combinations of parts that will be more fully hereinafter set forth, and then pointed out in the claims.

Reference is to be had to the accompanying drawings, forming part of this specification, wherein—

Figure 1:
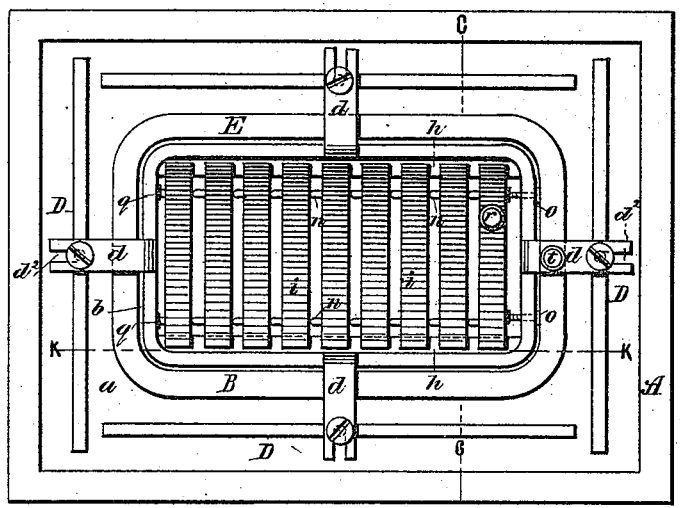
Figure 2:
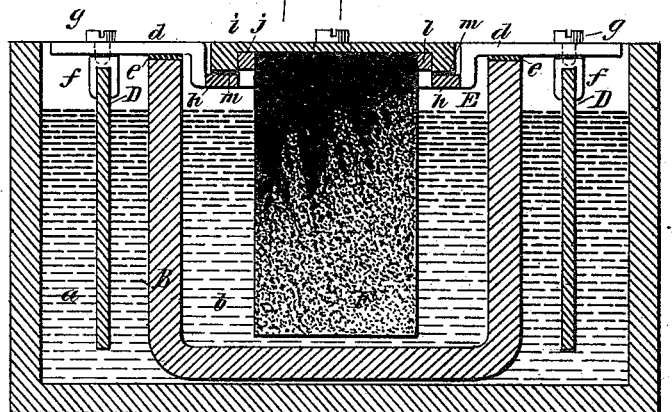
Figure 3:
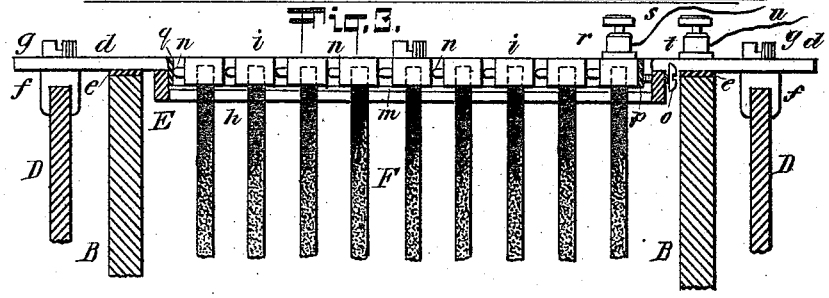
Figure 4:
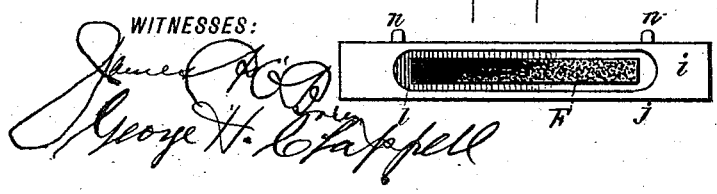

Figure 1 is a plan view of my improved battery. Fig. 2 is a vertical cross-section on the plane of the line $c\,c$, Fig. 1. Fig. 3 is a detail longitudinal section on the plane of the line $k\,k$, Fig. 1; and Fig. 4 is a view of the under side of the carbon-support.

In the accompanying drawings, the letter A indicates a suitable cell divided into two compartments $a\,b$ by a suitable cup or partition B, which separates the fluids in the compartments $a\,b$. The cup B or the partitions forming the compartment $b$ may be porous or dense carbon or otherwise arranged, as desired.

D are the zincs or positive electrodes, which are held in suspension in the compartment $a$ by a metal frame E, as shown. The frame E is supported by the cell or partitions B, and preferably has side lugs $d$, that rest on the cup, as shown, rubber or other insulation $e$ being interposed between said lugs or frame and the cup, as shown. The zincs or positive electrodes D are preferably secured to the lugs $d$ by clamps $f$, that receive screws or the like $g$, that connect them to the lugs $d$, as shown, the lugs $d$ preferably having slots $d^2$, that receive the screws $g$, so that the zincs can be quickly adjusted. By this means the zincs D are readily removable from the frame.

The frame E is open at its inner part and is preferably supported within the compartment $b$ or the cup B at its upper part, as shown.

The frame E has interior ledges $h$ on opposite sides that support negative electrode or carbon holders $i$, (see Fig. 2,) the negative electrodes or carbons F thereby hanging down within the compartment $b$, as shown. The carbon-holders $i$ consist of metal bars, preferably having recesses or sockets $j$, into which the carbons F project. After the carbons are placed in said sockets lead $l$ is poured in to bind and hold the carbons to the holders $i$.

Any suitable or desired number of carbons F may be carried by the frame E by resting the ends of the holders $i$ on the ledges $h$.

The carbon-holders and the carbons F are to be insulated from the frame E, and for this purpose rubber or other suitable insulation $m$ is placed between the ledges $h$ and the holders $i$, as shown.

The several carbon-holders $i$ should be in electrical connection, and for this purpose lugs or studs $n$ project from one side of each holder $i$ and impinge against the side of the next holder $i$, as shown. The lugs $n$ are used to compensate for uneven surfaces in the holders $i$. The several carbon-holders $i$ are to be held tightly together in the frame E, and may be so held by a screw $o$, carried by the frame E, suitable insulation $p$ being interposed between the screw $o$ and the adjacent holder $i$, as shown. Insulation $q$ is to be placed between the frame E and the holder or its lugs $n$ at the end of the series of holders $i$ opposite the screw $o$, as shown. By the above means the several carbons are securely held in the frame E, are thoroughly insulated from the frame E, and are readily and quickly adjustable in or removable from the frame E.

One of the holders $i$ may carry a suitable binding-post $r$, to which a wire $s$ can be attached, and the frame E may also carry a binding-post $t$, to which a wire $u$ is to be attached.

By the construction above described the zincs and carbons may be readily removed and replaced. The zincs can be removed and replaced separately and easily when worn out. The carbons can be easily and quickly removed and replaced and more or less placed in position with very little trouble.

A battery of the above construction will be cheap to make, will not be liable to get out of order, and will give great efficiency in use.

Having now described my invention, what I claim is—

1. The combination of the cell and an internal cup forming two compartments in the cell with a removable frame supported by said cup and insulated therefrom, said frame carrying both the positive and negative electrodes, one of said electrodes being insulated from said frame, substantially as described.

2. The cell and a cup within the same forming two compartments, combined with the frame supported by said cup and insulated therefrom, said frame carrying the positive electrode on its outer part outside of said cup and the negative electrode on its inner part within said cup, substantially as described.

3. The cell, a cup within the same, and the frame supported by said cup and insulated therefrom, combined with a removable negative electrode and a removable holder secured to and carrying the same and detachably supported by said frame, substantially as described.

4. The cell A, a cup within the same, and the frame supported on said cup and insulated therefrom, said frame having ledges $h$ on opposite sides, combined with an electrode and a removable holder $i$, carrying the same and resting at its ends on said ledges, substantially as described.

5. The cell A, a cup within the same, and the frame supported by said cup and insulated therefrom, combined with a removable negative electrode resting on and supported by said frame and insulation between said holder and said frame, substantially as described.

6. The cell, combined with a series of electrodes F, the series of holders $i$, having side projections $n$, that come against the side of the next holder, and insulation between the frame and holders, substantially as described.

7. The combination of the cell with a frame having internal ledges and clamping-screw $o$, negative electrodes, their holders $i$, and insulation between the holders and their supporting-frame, said holders being placed side by side on said ledges and held together by the screw $o$, substantially as described.

8. The cell A and an internal cup, combined with the frame supported by said cup and insulated therefrom, said frame having side lugs $d$ and positive electrodes supported by said lugs, internal ledges on said frame, negative electrodes or carbons, holders $i$, carrying said carbons and resting in said ledges, and insulation between said holders and said frame, substantially as described.

9. The positive electrodes having clamps secured to them, combined with the frame having slotted side lugs $d$, supporting said clamps, whereby said clamps are quickly adjustable on said lugs, and the cup supporting said frame, and with the cell containing said cup, substantially as described.

10. The holder $i$, having the recess $j$, combined with the electrode projecting into said recess and a binding metal poured into said recess around said electrode to hold it in said recess, the holder projecting beyond the electrode to support it, as specified.

In testimony that I claim the foregoing as my invention I have signed my name, in presence of two witnesses, this 19th day of April, 1890.

OSCAR A. ENHOLM.

Witnesses:
T. F. BOURNE,
G. H. CHAPPELL.